March 5, 1940.   J. G. HILL   2,192,226
TIRE ANTISKID DEVICE
Filed Nov. 2, 1938   2 Sheets-Sheet 2
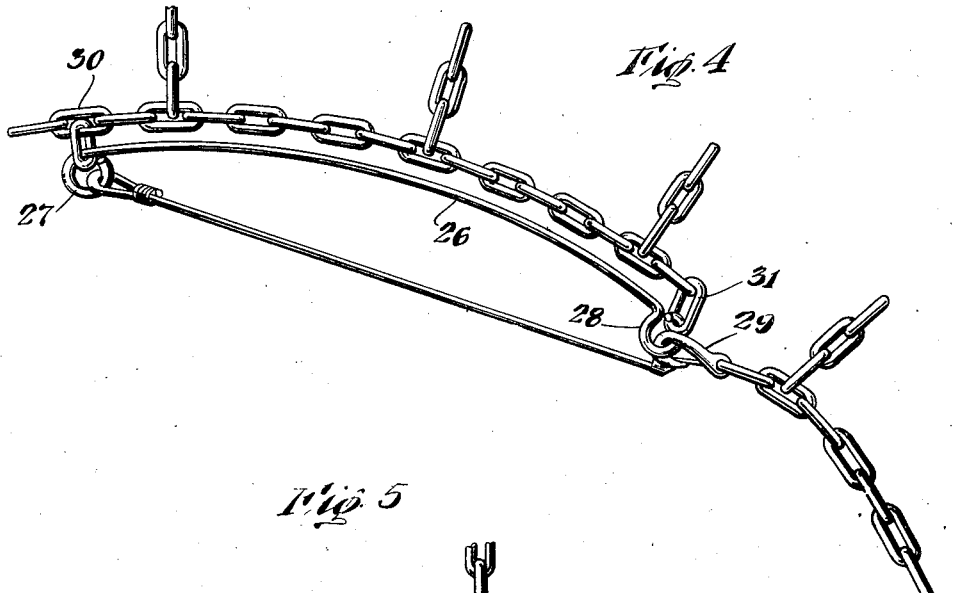
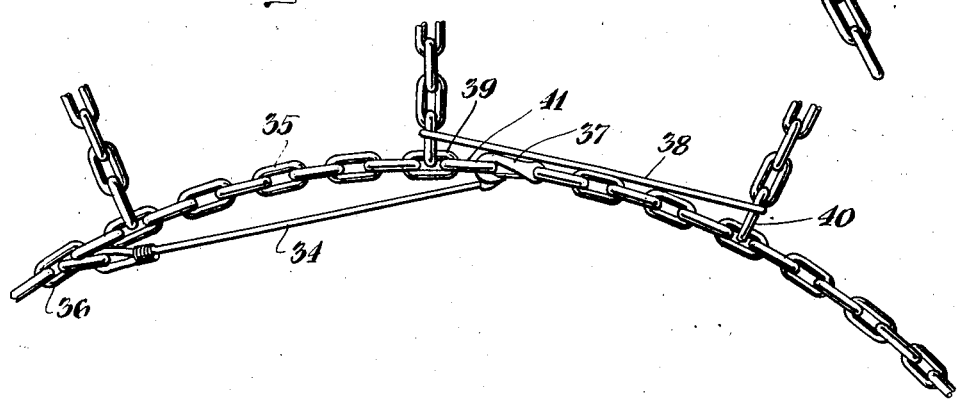
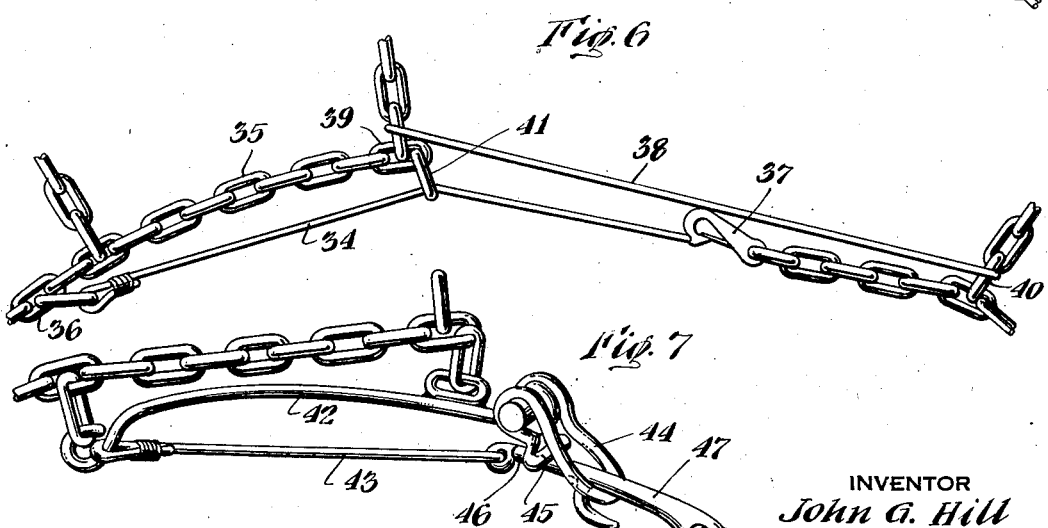
INVENTOR
John G. Hill
BY
ATTORNEYS Patented Mar. 5, 1940

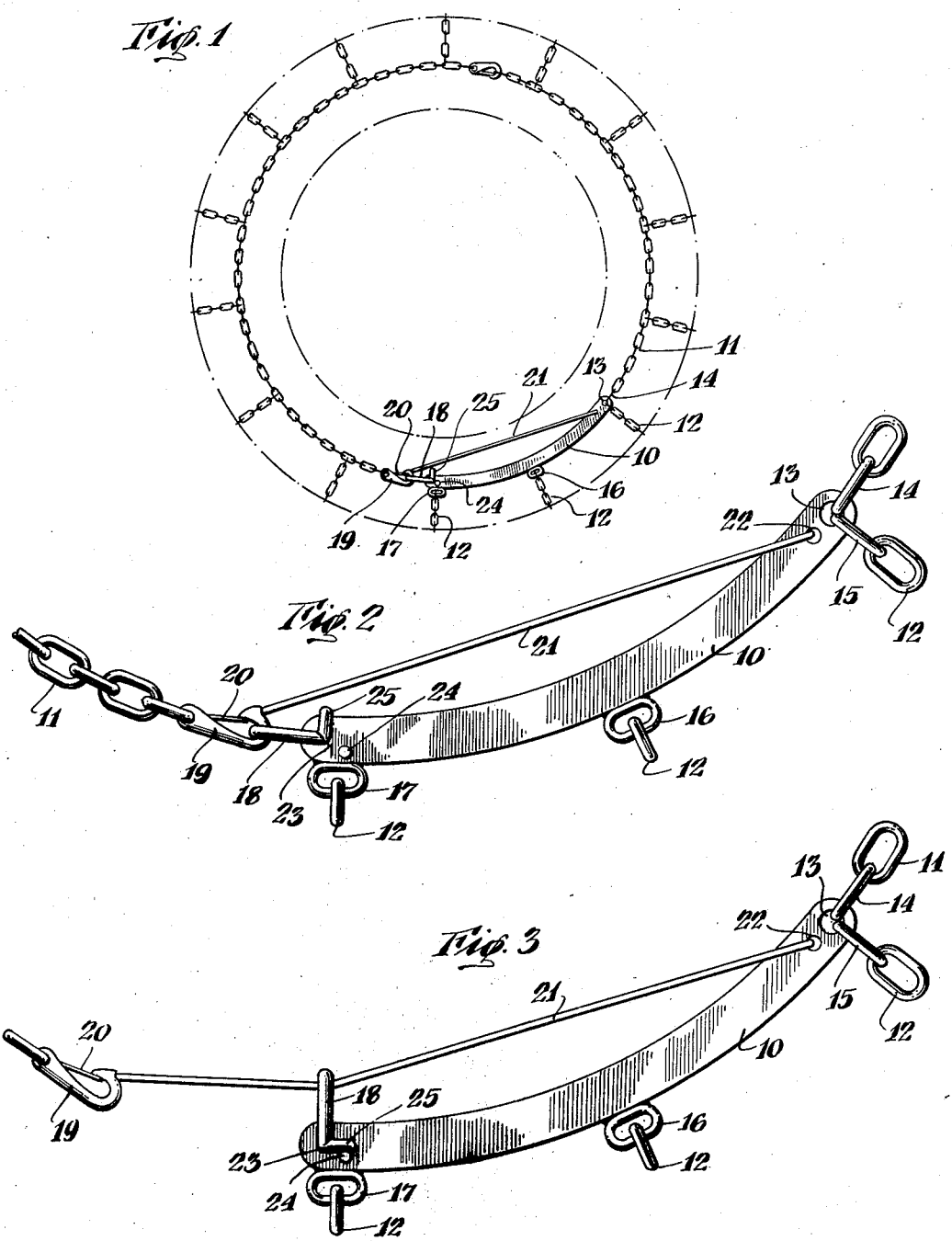

2,192,226

UNITED STATES PATENT OFFICE 2,192,226

TIRE ANTISKID DEVICE

John G. Hill, Franklin Township, Luzerne County, Pa.

Application November 2, 1938, Serial No. 238,346

12 Claims. (Cl. 152—241)

This invention relates to anti-skid devices for use on automobile tires. Among the objects of the invention is to provide an antiskid device or chain which is sufficiently simple to enable a person unskilled in mechanical matters or the average automobile driver to readily apply the antiskid device with little effort and minimum expenditure of time.

Another object of the invention is to provide an accessory which is adapted to be attached to the commonly known variety of antiskid device having closed ring chains for engaging the side walls of the tire, whereby the antiskid device may be converted into one possessed of the capability for quick application of the device to a tire.

Another object of the invention is to provide a quick fastening device adapted to fulfill the requirements of such a device and which is economical to manufacture and to assemble upon an antiskid chain.

Another object of the invention is to provide a device having an elastic element or elements which, when forming a part of a side ring of an antiskid device, enables the ring to be opened and extended for passage over the rim of a tire and then causes automatic closing of the ring.

Other and more detailed objects will be pointed out hereinafter in the accompanying specification and claims and shown in the drawings.

Figure 1 shows a general view of an antiskid device of my invention as mounted upon a tire.

Fig. 2 is an enlarged detail illustrating a portion of the side ring of the antiskid device of Fig. 1.

Fig. 3 illustrates the same portion of the ring of the antiskid device illustrated in Fig. 2, but with the circumference of the ring enlarged by the extension of an elastic element.

Fig. 4 shows another form for a quick-fastening device.

Figs. 5 and 6 illustrate two views of another manner of employing the principle of my invention. Fig. 5 shows the relation of the parts with the side ring closed and Fig. 6 shows the relation of the parts with the side ring opened or extended.

Fig. 7 illustrates another form of quick-fastening device.

For convenience I have chosen to describe my invention with reference to the common variety of antiskid device which employs a pair of chain rings for engaging opposite walls of a tire and having ground gripping elements extending between the rings over the rim of the tire. It is to be understood that my invention is applicable to any type of antiskid device whether or not it employs chain links as the principal elements constituting the side rings and ground gripping elements.

My invention contemplates the idea of making one of the side rings extensible without breaking the continuity of the ring while passing it over the rim of the tire, and providing for the automatic closing of the side ring so that the normal operating circumference of the ring is automatically resumed when the chain is mounted. When properly adjusted it is not necessary for a man to reach around to the inside side of the wheel to engage the fastening means. The engagement occurs automatically. To accomplish these ends I make the ends of the rings separable for enabling the ring to be opened. The continuity of the ring is maintained by an elastic element, preferably a strip of rubber, which is mounted in such a manner as to restore the ring to its normal circumference and cause the ends to lock together.

A form of construction which is suitable for assembly in the side chain of an antiskid device at the time of manufacture is illustrated in Figs. 1, 2 and 3. In this construction I provide a relatively stiff member 10 having a radius corresponding to the radius of the inside ring 11 of the antiskid device when it is mounted upon a tire, as illustrated in Fig. 1. I have found it convenient to make the length of the stiff member to correspond approximately with the length of the portion or arc of the chain circumference determined by three ground gripping elements 12, but the length is a matter of choice. The portion of the side ring 11 extending between three ground gripping elements or cross-chains of an ordinary antiskid device is replaced by the stiff member 10. The stiff member may be made from flat metal, such as steel, with the broad side of the member to lie against the tire wall.

For enabling assembly, the stiff member 10 is provided at one end with a hole 13 which is engaged by a link 14 of the side chain and a link 15 of a cross-chain. In place of holes rings may be used. A ring or link 16 may be welded to the stiff member for attaching the intermediate cross-chain and a similar link 17 may be provided for securing the third cross-chain. The side ring with the stiff member constituting a part thereof is completed through the stiff member by means of an eye 18 which is pivotally mounted at the end of the stiff member which is at the breaking point of the side ring. Hook 19 corresponds to the usual hook used as one of the engaging means to close the side ring for normal use. Any appropriate type of hook may be used for this purpose, but I prefer to use a common form of hook having a cantilever spring 20 for closing the opening in the hook to insure that the hook will not become disengaged from the eye. During normal functioning of the antiskid device, the ring will have the general appearance illustrated in Fig. 1.

To enable extension of the ring for passing the same over the rim of the tire, I provide an extensible element in the form of a strip of rubber 21, but other equivalent elastic or yielding material, such as a spring, may be used. This elastic element is so connected that it will tend to draw together the ends of the ring at the breaking point. As explained hereinabove, the stiff member 10 constitutes an arc or portion of the side ring. The elastic element 21 is connected to the stiff member at its end which is back from the eye end or breaking point end of the member. An extra opening 22 may be provided for that purpose or the opening already provided may be used. The other end of the elastic element is secured to the hook 19. This may be accomplished by folding the edges of the hook over the rubber or by vulcanizing the rubber to the hook. The arrangement is such that when the hook 19 engages the eye 18, the elastic element will extend between the hook and the other end of the arc formed by the stiff member and thus constitute a chord. When the hook is disengaged from the eye 18 and drawn away therefrom, the elastic element will pass through the eye and be stretched in the manner illustrated in Fig. 3. This enables the circumference of the ring to be opened sufficiently to pass the chain over the rim of a tire.

In order to facilitate the automatic locking of the device and the engagement of the eye 18 and hook 19, I have arranged to pivot the eye at 23 so that the eye will assume a position other than that in which it constitutes a part of the circumference. The pivotal movement of the eye preferably has a limit which may be established by a stop pin 24. This is engaged by a finger 25 carried by the eye.

The antiskid device is mounted upon the tire by first seeing that the hook and eye are disengaged. The operator then takes a hold of the middle of the side chain (opposite the hook and eye) and mounts this portion of the chain over the tire and thereafter works the remainder of the chain at each side until all of the chain passes over the rim of the tire. The device is intended to facilitate application of the chain to a wheel on the ground and in this case all of the chain, with the exception of short lengths adjacent the disengaged hook and eye, passes over the tire. By moving the car a small amount, the wheel may be made to pass over the elastic element and after this has been accomplished the elastic element will operate to draw the hook 19 into engagement with the eye. Locking engagement will automatically occur as the side ring closes to its normal operating circumference under the action of the elastic element.

The device shown in Figs. 1, 2 and 3 contemplates the replacement of a portion of the side chain by a stiff member. I have illustrated in Fig. 4 another form of the stiff member. This is a wire 26 provided with loops 27 and 28 at its ends, loop 27 being provided for attachment of a link to the side chain and loop 28 being provided for attachment of a side chain and as an eye in which the hook 29 is to engage. The extensible element is secured at one end in the loop 27 and is adapted to pass through the loop 28 when the ends of the chain are separated.

This form of the device has the advantage that it can be sold as an accessory and readily attached to the usual antiskid chain. In using this form of stiff member, it is necessary only that it be secured to a side chain and it is not necessary that links extending along the rigid member be removed. With these links in place the continuity of the links of the side chain is retained. It is necessary only that connection be made as, for example, with links 30 and 31.

Another manner for providing an automatic closing and locking arrangement for the side ring of an antiskid chain is illustrated in Figs. 5 and 6. In this form of device, the elastic element by which the hook and eye are drawn into engagement functions similarly to the elastic element previously described. The elastic element is extended as a chord between a number of links of a side chain 35. It may be anchored to one of such links 36 or to an auxiliary link. Its other end is engaged to the hook 37 which is secured to the other end of the side chain. The elastic element 34 will tend to draw the chain ring to a lesser circumference. The arc of the chord defined by the elastic element 34 constitutes a number of links of the side chain which could otherwise remain limp unless means were provided for extending them. For maintaining these few links taut, I provide another elastic element 38 which is connected at one end to the end 39 of the chain and at its other end to the other end of the chain at 40. A link or eye 41 serves as one of the disengageable connecting-means. This eye is engaged by the hook when the chain is in condition for normal use, as illustrated in Fig. 5.

For mounting the chain upon the tire, hook 37 is disengaged from eye 41 and these two fastening means are separated so as to provide sufficient circumference to enable the chain to be passed over the rim of a tire. When this is done, the elastic elements 34 and 38 are stretched the required amount. The relation of the various elements of this arrangement when application is being made to a tire, is illustrated in Fig. 6.

The form of device illustrated in Fig. 7 is somewhat similar to that illustrated in Figs. 4 and 5 in that a stiff member 42 and an elastic element 43 are provided. The end of the stiff member, which is disposed at the breaking point of the chain, carries a pivoted eye or loop 44. This loop carries a laterally extending finger 45 which is so placed as to extend across and above a continuation 46 of the hook 47. This hook 47 functions similarly to hooks previously described. When the hook is disengaged from the loop 44, the elastic element 43 in its stretched state will be guided by the loop 44. Because of its pivotal connection with the stiff member 42, loop 44 will extend radially with respect to the wheel and thereby facilitate movement of the elastic element and hook as the side ring is being drawn to a closed condition under the urge of the elastic member. In use, hook 47 causes the loop to swing upon its pivot into the position shown in Fig. 7. In this position there is tension in the links of the side chain and the laterally extending finger 45 bears upon continuation 46 of the hook and maintains the hook and loop in engaging relationship. The construction is such that it is self-engaging and interlocking so that it can not become disengaged during use.

It should be apparent from the foregoing that an important feature of the invention involves providing sufficient restraint to the ends of a side chain to keep them under control so that they may be united automatically. While I have described various means for accomplishing this, I wish it to be understood that when a stiff element is used, such element may assume forms other than those illustrated as, for example, a tube in which the elastic element would be protected and guided.

What is claimed is:

1. In a tire antiskid device, the combination comprising a pair of side rings for flanking a tire, each of said side rings comprising chain links, ground engaging elements connecting the side rings at intervals around the rings, at least one of said side rings having disengageable members enabling breaking of the ring for permitting its passage over the rim of a tire, said disengageable members comprising a hook attached to the ring at one side of the breaking point, and an eye attached to the ring at the other side of the breaking point, said hook and eye being in engagement for normal operation of the device, an elastic element having an anchor end secured to the ring at a point back from said eye and its other end connected to said hook and thereby spanning the breaking point of said ring between said hook and eye, and a rigid member connected to the side chain and extending back from said eye to the anchor end of said elastic member.

2. In a tire antiskid device, the combination comprising a pair of side rings for flanking a tire, each of said side rings comprising chain links, ground engaging elements connecting the side rings at intervals around the rings, at least one of said side rings having disengageable members enabling breaking of the ring for permitting its passage over the rim of a tire, said disengageable members comprising a hook attached to the ring at one side of the breaking point, a stiff member attached to the ring at the other side of the breaking point, said stiff member having an eye pivotally mounted thereon, and an elastic element having one end secured to the stiff member at a point spaced from said eye and its other end connected to said hook, said elastic element being so connected to the hook as to pass through the eye when the hook and eye are disengaged and the elastic element is extended, whereby said hook is drawn into engagement with the eye by the contraction of the extended elastic element when the antiskid device is mounted upon a tire.

3. In a tire antiskid device, the combination comprising a pair of side rings for flanking a tire, each of said side rings comprising chain links, ground engaging elements connecting the side rings at intervals around the rings, at least one of said side rings having disengageable members enabling breaking of the ring for permitting its passage over the rim of a tire, said disengageable members comprising a hook attached to the ring at one side of the breaking point and an eye attached to the ring at the other side of the breaking point, and an elastic element having one end secured to the ring at a point back from said eye and its other end connected to said hook, said elastic element being arranged to pass through said eye, and adapted to be extended to complete the continuity of an enlarged circumference (including the side ring and elastic element) for enabling passage of the opened side ring over the rim of a tire without relieving restraint upon the separated ends carrying the hook and eye provided by the extended elastic element connecting the separated ends.

4. A quick-fastening device for use with a skid chain having connected ends which are disconnectible for permitting passage of the chain over the rim of a tire, said quick-fastening device comprising a stiff member for attachment to the chain at its link end and at another point back from said link end, an elastic member connected to the stiff member at a point back from said link end, and a hook member attached to the other end of said elastic member and adapted to be fastened to the other end of a skid chain, said elastic member extending through an eye at the link end of the skid chain and acting to pull the hook through the link for effecting connection of the hook with the end of the chain carrying the stiff member when the quick-fastening device is associated with a skid chain on a tire.

5. The quick-fastening device set forth in claim 4 in which the eye through which the elastic member is arranged to pass is pivotally connected to the stiff member.

6. In an antiskid chain comprising a ring chain having a hook and eye for fastening the ends of the chain together, a pair of elastic elements for drawing the hook and eye ends of the chain toward each other when the chain is being mounted on a tire, one of said elastic elements having one end fastened to the eye end of the chain and its other end fastened to the hook end of the chain at a point back from the hook, and the other of said elastic elements having one end fastened to the hook end of the chain and its other end fastened to the link end of the chain at a point back from the eye end of the chain.

7. A device for facilitating the engagement of the ends of a side ring of an antiskid chain when the chain is being mounted upon a tire, said device comprising a stiff member for fastening to the side ring at one of its disconnectible ends, an eye carried at one end of the stiff member for serving as one of the connecting elements for the side ring, a hook for engaging said eye and constituting the second connecting element for the side ring, and an extendible rubber member fastened to said hook and anchored to said stiff member at a point thereon removed from the eye on the stiff member, the length of said elastic member being such that some extension thereof is required for reaching from its anchor end to the hook to which it is fastened when the hook is in engagement with the eye on the stiff member and it being adapted for further extension of its length when said hook is disengaged from its associated eye.

8. A device for facilitating the engagement of the ends of a side ring of an antiskid chain when the chain is being mounted upon a tire, said device comprising a stiff member, two eyes separated from each other on said stiff member, a hook for engaging one of said eyes for forming a hook and eye connection, and an elastic member secured at one of its ends to said hook and at the other of its ends to the other of said eyes, said elastic member having such length as to require its extension from its normal condition when the hook is in engagement with the eye of said hook and eye connection.

9. In a tire antiskid device, the combination comprising a ring for engaging with one side of a tire, a second ring for engaging with the far side of a tire, ground gripping elements connecting said two side rings together, said far side ring having disconnectible members by which the ring may be opened to permit its passage over the rim of a tire, means for bringing together the open ends of said far side ring, said means comprising an elastic element having its ends connected to different portions of said far side ring, said elastic element being of less length than the circumference of said side ring and including in its span said disconnectible members so that when they are disconnected from each other to permit opening of the far side ring for its passage over the rim of a tire an attracting force is thereby maintained on the disconnected members, and means cooperating with said elastic element to guide the disconnected members into engaging relationship to close the far side ring when said antiskid device is mounted upon a tire.

10. An antiskid device for vehicle tires comprising a pair of side rings interconnected by a plurality of spaced ground gripping elements, one of said rings having separable ends, cooperable fastening elements carried by said ends, and resilient means operative when said ends are separated to urge them together and interlock said fastening elements.

11. An antiskid device for vehicle tires comprising a pair of side rings interconnected by a plurality of spaced ground gripping elements, said rings having a circumference smaller than that of the tire to be fitted, one of said rings having separable ends normally interlocked, resilient means bridging said ends when they are separated, said means urging said separated ends towards one another whereby their interlocked relationship may be established.

12. In a tire antiskid device, the combination comprising a ring for engaging with one side of a tire, another ring for engaging with the far side of a tire, said last named ring being normally closed and of less circumference than the rim of the tire but sufficiently extensible to be passed over the rim of the tire without breaking the ring, an elastic element having its ends connected in and forming a part of the circumference of said last named ring, disengageable elements in said ring for maintaining the ring inextensible for use on a tire, said last named side ring having provisions for guiding said disengageable elements into locking relationship, and ground engaging elements connecting the two rings together.

JOHN G. HILL.